United States Patent
Seo et al.

(10) Patent No.: US 10,570,229 B2
(45) Date of Patent: Feb. 25, 2020

(54) METHOD OF PREPARING STYRENE-BASED RESIN AND STYRENE-BASED RESIN PREPARED THEREBY

(71) Applicant: LG CHEM, LTD., Seoul (KR)

(72) Inventors: Jae Bum Seo, Daejeon (KR); Chang Hun Han, Daejeon (KR); Dae Woo Lee, Daejeon (KR); Jung Tae Park, Daejeon (KR); Gyu Sun Kim, Daejeon (KR)

(73) Assignee: LG Chem, LTD., Seoul (KR)

( * ) Notice: Subject to any disclaimer, the term of this patent is extended or adjusted under 35 U.S.C. 154(b) by 111 days.

(21) Appl. No.: 15/739,674

(22) PCT Filed: Nov. 2, 2016

(86) PCT No.: PCT/KR2016/012540
§ 371 (c)(1),
(2) Date: Dec. 22, 2017

(87) PCT Pub. No.: WO2017/099361
PCT Pub. Date: Jun. 15, 2017

(65) Prior Publication Data
US 2018/0201707 A1 Jul. 19, 2018

(30) Foreign Application Priority Data
Dec. 7, 2015 (KR) .................. 10-2015-0173412

(51) Int. Cl.
*C08F 212/10* (2006.01)
*C08F 6/10* (2006.01)
*C08F 2/38* (2006.01)
*C08F 2/04* (2006.01)
*C08F 2/44* (2006.01)

(52) U.S. Cl.
CPC .............. *C08F 212/10* (2013.01); *C08F 2/04* (2013.01); *C08F 2/38* (2013.01); *C08F 2/44* (2013.01); *C08F 6/10* (2013.01); *C08F 2800/20* (2013.01)

(58) Field of Classification Search
CPC .................. C08F 6/10; C08F 212/10
See application file for complete search history.

(56) References Cited

U.S. PATENT DOCUMENTS

| 4,677,171 | A | * | 6/1987 | Morris | B01J 19/0013 526/68 |
| 6,593,424 | B2 | * | 7/2003 | Lee | C08F 2/06 525/233 |
| 8,258,244 | B2 | * | 9/2012 | Yamashita | C08F 2/01 526/310 |
| 9,458,313 | B2 | | 10/2016 | Seo et al. | |
| 2003/0032747 | A1 | | 2/2003 | Lee et al. | |
| 2010/0036065 | A1 | * | 2/2010 | Sohn | C08F 2/02 526/65 |
| 2016/0108224 | A1 | | 4/2016 | Seo et al. | |
| 2017/0121436 | A1 | * | 5/2017 | Kang | C08F 212/10 |

FOREIGN PATENT DOCUMENTS

| CN | 1455786 A | 11/2013 | |
| CN | 105008417 A | 10/2015 | |
| EP | 2937366 A1 | 10/2015 | |
| EP | 3127927 A1 | 2/2017 | |
| KR | 10-0839652 B1 | 6/2008 | |
| KR | 10-2008-0059841 A | 7/2008 | |
| KR | 10-2011-0061757 A | 6/2011 | |
| KR | 10-2012-0057186 A | 6/2012 | |
| KR | 10-2015-0068114 A | 6/2015 | |
| KR | 10-2016-0074729 A | 6/2016 | |
| WO | 02053608 A1 | 7/2002 | |
| WO | WO-2016175423 A1 * | 11/2016 | ............ C08F 212/10 |

OTHER PUBLICATIONS

Extended European Search Report for EP Application No. 16873227.9, dated Jun. 25, 2018.
International Search Report for PCT/KR2016/012540 filed on Nov. 2, 2016.

\* cited by examiner

*Primary Examiner* — Nicole M. Buie-Hatcher

(57) ABSTRACT

The present invention relates to a method of preparing a styrene-based resin having a low oligomer content and a styrene-based resin prepared thereby. The preparation method according to the present invention may prepare a styrene-based resin having a reduced oligomer content by using a polymerization initiator having a 1 hour half-life temperature, which is 5° C. to 25° C. lower than a temperature during polymerization, and controlling devolatilization conditions.

11 Claims, No Drawings

METHOD OF PREPARING STYRENE-BASED RESIN AND STYRENE-BASED RESIN PREPARED THEREBY

CROSS-REFERENCE TO RELATED APPLICATION

This application is a U.S. National Stage of PCT/KR2016/012540, filed Nov. 2, 2016, which claims priority to and the benefit of Korean Patent Application No. 10-2015-0173412, filed on Dec. 7, 2015, the disclosures of which are incorporated herein by reference in their entirety.

TECHNICAL FIELD

The present invention relates to a method of preparing a styrene-based resin having a low oligomer content and a styrene-based resin prepared thereby.

BACKGROUND ART

In general, a styrene-based copolymer, for example, a styrene-acrylonitrile copolymer, is being widely used in various industrial fields including office automation (OA) equipment, such as a computer, a printer, and a copy machine, home appliances, such as a television and an audio, electrical and electronic parts, automotive parts, and miscellaneous goods due to excellent formability, stiffness, and electrical properties. In particular, a heat-resistant styrene-based copolymer, which withstands a high external temperature by increasing heat resistance, is being used for special purposes, for example, housings for home appliances and automobile interior materials.

Excellent surface properties, such as transparency, are essentially required for a resin used as an exterior material such as a material for food containers, but, since a styrene-based copolymer prepared by a conventional preparation method contains a large amount of an oligomer component, fume and gas may be generated during processing of the styrene-based copolymer. Thus, processability may not only be low, but also surface properties of a processed product prepared may be reduced and heat resistance and weather resistance may be reduced. Thus, research to develop a styrene-based copolymer having a low oligomer content while maintaining original characteristics of a styrene-based copolymer has been conducted.

However, a styrene-based copolymer having excellent impact resistance or excellent impact resistance and heat resistance is being developed through much research, but development of a styrene-based copolymer, which may have excellent surface properties due to a low oligomer content while having excellent impact resistance and heat resistance, is insignificant.

Thus, in order to further increase utilization of a styrene-based copolymer, there is a need to develop a styrene-based copolymer having improved surface properties.

DISCLOSURE OF THE INVENTION

Technical Problem

The present invention provides a method of preparing a styrene-based resin having excellent surface properties, for example, transparency, by suppressing the formation of an oligomer, as well as excellent heat resistance.

The present invention also provides a styrene-based resin prepared by the above method.

Technical Solution

According to an aspect of the present invention, there is provided a method of preparing a styrene-based resin including the steps of: adding a polymerization initiator to a mixed solution including a reaction solvent, an aromatic vinyl-based monomer, and an ethylenically unsaturated nitrile-based monomer and performing polymerization to prepare a polymerization product (step 1); and devolatilizing the polymerization product (step 2), wherein the polymerization initiator is an organic peroxide having a 1 hour half-life temperature of 105° C. to 145° C.

According to another aspect of the present invention, there is provided a styrene-based resin prepared by the above method.

Advantageous Effects

A method of preparing a styrene-based resin according to an embodiment of the present invention may prepare a styrene-based resin having a reduced oligomer content by using a polymerization initiator having a 1 hour half-life temperature, which is 5° C. to 25° C. lower than a temperature during polymerization, and controlling devolatilization conditions.

Also, a styrene-based resin according to the present invention may have a low oligomer content, and thus, the styrene-based resin may have excellent surface properties while having high heat resistance.

Thus, the method of preparing a styrene-based resin and the styrene-based resin according to the present invention are suitable for industries that need them, for example, industries that need a styrene-based resin having excellent heat resistance and surface properties.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method of preparing a styrene-based resin having excellent surface properties and heat resistance.

The preparation method according to an embodiment of the present invention includes the steps of: adding a polymerization initiator to a mixed solution including a reaction solvent, an aromatic vinyl-based monomer, and an ethylenically unsaturated nitrile-based monomer and performing polymerization to prepare a polymerization product (step 1); and devolatilizing the polymerization product (step 2), wherein the polymerization initiator is an organic peroxide having a 1 hour half-life temperature of 105° C. to 145° C.

The expression "half-life temperature" used in the present invention is an index representing a decomposition rate of a material, wherein it may denote a temperature required to decompose 50% of an initial material at a specific time. For example, the 1 hour half-life temperature of the polymerization initiator may denote a temperature required to decompose 50% of the polymerization initiator for 1 hour.

Step 1 is a step for preparing a polymerization product by performing a polymerization reaction using a monomer mixed solution.

Specifically, step 1 may be performed by adding a polymerization initiator to a mixed solution including a reaction solvent, an aromatic vinyl-based monomer, and an ethylenically unsaturated nitrile-based monomer and performing polymerization.

The reaction solvent may be at least one selected from the group consisting of ethylbenzene, toluene, xylene, methylethylketone, and methylisobutylketone. Specifically, the reaction solvent may be ethylbenzene. The reaction solvent may be used so that it is included in an amount of 10 wt % to 30 wt % in the mixed solution. In a case in which the reaction solvent is included in an amount of less than 10 wt % in the mixed solution, control may be difficult due to high viscosity, and, in a case in which the reaction solvent is included in an amount of greater than 30 wt % in the mixed solution, it may be difficult to effectively control the shape of particles formed during the polymerization.

The aromatic vinyl-based monomer may be at least one selected from the group consisting of styrene, α-methylstyrene, p-bromostyrene, p-methylstyrene, p-chlorostyrene, and o-bromostyrene, and, specifically, may be styrene. The aromatic vinyl-based monomer may be used so that it is included in an amount of 35 wt % to 70 wt % in the mixed solution.

The ethylenically unsaturated nitrile-based monomer may be at least one selected from the group consisting of acrylonitrile, methacrylonitrile, ethacrylonitrile, phenylacrylonitrile, and α-chloroacrylonitrile, and, specifically, may be acrylonitrile. The ethylenically unsaturated nitrile-based monomer may be used so that it is included in an amount of 10 wt % to 35 wt % in the mixed solution.

As described above, the polymerization initiator may have a 1 hour half-life temperature of 105° C. to 135° C. Also, the 1 hour half-life temperature of the polymerization initiator may be reduced by 5° C. to 25° C. in comparison to a temperature during polymerization to be described later.

Specifically, the polymerization initiator may be at least one selected from the group consisting of dicumyl peroxide, 2,2-bis(4,4-di-t-butylperoxy cyclohexane)propane, 1,1-bis(t-butylperoxy)-3,3,5-trimethylcyclohexane, 1,1-bis(t-butylperoxy)cyclohexane, and 1,1-bis(t-hexylperoxy)cyclohexane.

The polymerization initiator may be added in an amount of 0.01 part by weight to less than 0.06 part by weight based on 100 parts by weight of total monomers. In a case in which the polymerization initiator is added in an amount of less than 0.01 part by weight, an oligomer formation inhibitory effect may be insignificant, and, in a case in which the polymerization initiator is added in an amount of 0.06 part by weight or more, haze may be increased due to an increase in viscosity of a reaction system and a change in sequences of polymer chains.

The polymerization may be performed in a temperature range of 130° C. to 150° C. In a case in which the temperature of the polymerization is adjusted to the above range, the formation of an oligomer during the polymerization may be reduced.

The polymerization may be performed by bulk polymerization. In this case, the bulk polymerization may be batch bulk polymerization or continuous bulk polymerization, and, in a case in which the bulk polymerization is continuous bulk polymerization, the polymerization may include at least one polymerization step. Herein, the expression "at least one" may denote a minimum of one, or one or more. Also, in a case in which the bulk polymerization is continuous bulk polymerization, the number of the polymerization steps may be appropriately adjusted as desired, and polymerization conditions of each polymerization step may be adjusted equally or differently.

Furthermore, the polymerization may be performed by further adding a chain transfer agent if necessary. The chain transfer agent is not particularly limited, but the chain transfer agent may be used in an amount of 0.01 part by weight to 0.1 part by weight based on 100 parts by weight of the total monomers.

At least one selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan may be used as the chain transfer agent, but the present invention is not limited thereto.

In order to remove an unreacted monomer and the reaction solvent from a polymerization product prepared in step 1 and prepare a desired styrene-based resin, step 2 is a step of devolatilizing the polymerization product.

The devolatilization may be performed in one or two steps.

Specifically, the devolatilization may be performed in a temperature range of 230° C. to 250° C. and a pressure of 20 torr or less.

Also, the devolatilization may be performed through two-stage devolatilization in which primary devolatilization is performed in a temperature range of 150° C. to 160° C. and a pressure of 400 torr or less and secondary devolatilization is performed in a temperature range of 230° C. to 250° C. and a pressure of 20 torr or less.

The unit "torr" used in the present invention is a pressure unit, wherein 1 torr is equal to 133.3 Pa.

In the preparation method according to the embodiment of the present invention, since the devolatilization is performed under the above-described conditions, the oligomer formed during the polymerization may be removed as much as possible, and thus, an oligomer content in the finally prepared styrene-based resin may be further reduced.

Furthermore, the present invention provides a styrene-based resin prepared by the above preparation method.

The styrene-based resin according to an embodiment of the present invention may be a copolymer including an aromatic vinyl-based monomer-derived unit and an ethylenically unsaturated nitrile-based monomer-derived unit.

Herein, the derived unit may denote a structure caused by a certain material, a material, or the material itself.

The styrene-based resin may have an oligomer content of 0.3 wt % to 1.5 wt %.

Also, the styrene-based resin may have a glass transition temperature of 110° C. to 120° C.

Since the styrene-based resin according to the embodiment of the present invention is prepared by the above-described method, the oligomer content may be low, and thus, its heat resistance and surface properties may be excellent.

Hereinafter, the present invention will be described in more detail, according to specific examples and experimental examples. However, the following examples and experimental examples are merely presented to exemplify the present invention, and the scope of the present invention is not limited thereto.

Hereinafter, a unit of parts by weight used in the examples and comparative examples is represented based on 100 parts by weight of a total sum of toluene, styrene, and acrylonitrile.

EXAMPLE 1

20 wt % of toluene, 56 wt % of styrene, and 24 wt % of acrylonitrile were mixed to prepare a mixed solution. 0.03 part by weight of dicumyl peroxide and 0.1 part by weight of t-dodecyl mercaptan were added to the prepared mixed solution, and polymerization was then performed at 150° C. to prepare a polymerization product while the mixed solution was added to a 26 L polymerization reactor at a constant rate of 10 kg/hr. The prepared polymerization product was transferred to a devolatilization tank, and an unreacted monomer and a reaction solvent were recovered and removed at a temperature of 235° C. and a pressure of 15 torr to prepare a styrene-acrylonitrile resin in the form of pellets.

EXAMPLE 2

A styrene-acrylonitrile resin in the form of pellets was prepared in the same manner as in Example 1 except that the prepared polymerization product was transferred to a devolatilization tank, and an unreacted monomer and a reaction solvent were recovered and removed by performing primary devolatilization at a temperature of 160° C. and a pressure of 300 torr and performing secondary devolatilization at a temperature of 235° C. and a pressure of 15 torr.

EXAMPLE 3

A styrene-acrylonitrile resin in the form of pellets was prepared in the same manner as in Example 2 except that 0.05 part by weight of dicumyl peroxide was used.

EXAMPLE 4

A styrene-acrylonitrile resin in the form of pellets was prepared in the same manner as in Example 2 except that 0.02 part by weight of dicumyl peroxide was used.

EXAMPLE 5

A styrene-acrylonitrile resin in the form of pellets was prepared in the same manner as in Example 2 except that 2,2-bis(4,4-di-t-butylperoxy cyclohexane)propane was used instead of dicumyl peroxide and polymerization was performed at a polymerization temperature of 135° C.

EXAMPLE 6

A styrene-acrylonitrile resin in the form of pellets was prepared in the same manner as in Example 2 except that 1,1-bis(t-butylperoxy)cyclohexane was used instead of dicumyl peroxide and polymerization was performed at a polymerization temperature of 130° C.

EXAMPLE 7

A styrene-acrylonitrile resin in the form of pellets was prepared in the same manner as in Example 2 except that 64 wt % of styrene and 16 wt % of acrylonitrile were used.

EXAMPLE 8

A styrene-acrylonitrile resin in the form of pellets was prepared in the same manner as in Example 1 except that the prepared polymerization product was transferred to a devolatilization tank, and an unreacted monomer and a reaction solvent were recovered and removed at a temperature of 245° C. and a pressure of 15 torr.

EXAMPLE 9

A styrene-acrylonitrile resin in the form of pellets was prepared in the same manner as in Example 1 except that the prepared polymerization product was transferred to a devolatilization tank, and an unreacted monomer and a reaction solvent were recovered and removed at a temperature of 235° C. and a pressure of 10 torr.

COMPARATIVE EXAMPLE 1

A styrene-acrylonitrile resin in the form of pellets was prepared in the same manner as in Example 1 except that polymerization was performed without using dicumyl peroxide during the preparation of the polymerization product.

COMPARATIVE EXAMPLE 2

A styrene-acrylonitrile resin in the form of pellets was prepared in the same manner as in Example 1 except that polymerization was performed at a polymerization temperature of 160° C.

COMPARATIVE EXAMPLE 3

A styrene-acrylonitrile resin in the form of pellets was prepared in the same manner as in Example 2 except that 0.06 part by weight of dicumyl peroxide was used.

COMPARATIVE EXAMPLE 4

A styrene-acrylonitrile resin in the form of pellets was prepared in the same manner as in Example 1 except that the prepared polymerization product was transferred to a devolatilization tank, and an unreacted monomer and a reaction solvent were recovered and removed at a temperature of 225° C. and a pressure of 15 torr.

COMPARATIVE EXAMPLE 5

A styrene-acrylonitrile resin in the form of pellets was prepared in the same manner as in Example 1 except that the prepared polymerization product was transferred to a devolatilization tank, and an unreacted monomer and a reaction solvent were recovered and removed by performing primary devolatilization at a temperature of 160° C. and a pressure of 500 torr and performing secondary devolatilization at a temperature of 235° C. and a pressure of 15 torr.

COMPARATIVE EXAMPLE 6

A styrene-acrylonitrile resin in the form of pellets was prepared in the same manner as in Example 1 except that the prepared polymerization product was transferred to a devolatilization tank, and an unreacted monomer and a reaction solvent were recovered and removed by performing primary devolatilization at a temperature of 160° C. and a pressure of 300 torr and performing secondary devolatilization at a temperature of 235° C. and a pressure of 30 torr.

COMPARATIVE EXAMPLE 7

A styrene-acrylonitrile resin in the form of pellets was prepared in the same manner as in Example 2 except that 1,1-bis(t-butylperoxy)cyclohexane was used instead of dicumyl peroxide and polymerization was performed at a polymerization temperature of 130° C.

COMPARATIVE EXAMPLE 8

A styrene-acrylonitrile resin in the form of pellets was prepared in the same manner as in Example 2 except that t-butyl peroxy-2-ethylhexanoate having a 1 hour half-life temperature of 92° C. was used instead of dicumyl peroxide.

(4) Haze

Each resin was injection-molded to prepare a sample having a thickness of 3.175 mm, and haze (%) was measured according to ASTM D1003.

(5) Mold Deposit

After each resin was injected 50 times using an injection machine, a state of a mold was visually observed and indicated by a five-point method. In this case, when the state was very good, it was indicated by 1 point, and when the state was very poor, it was indicated by 5 point.

TABLE 1

| Category | Component analysis (wt %) | | Glass transition temperature (° C.) | Haze (%) | Oligomer content (wt %) | Mold deposit (point) |
| --- | --- | --- | --- | --- | --- | --- |
| | Styrene-derived unit | Acrylonitrile-derived unit | | | | |
| Example 1 | 72.3 | 27.7 | 111.3 | 0.3 | 1.3 | 2 |
| Example 2 | 72.4 | 27.6 | 112.4 | 0.2 | 0.7 | 1 |
| Example 3 | 72.5 | 27.7 | 112.6 | 0.2 | 0.6 | 1 |
| Example 4 | 72.3 | 27.7 | 112.1 | 0.3 | 0.8 | 1 |
| Example 5 | 72.3 | 27.7 | 113.1 | 0.2 | 0.5 | 1 |
| Example 6 | 72.1 | 27.9 | 113.5 | 0.2 | 0.4 | 1 |
| Example 7 | 81.6 | 18.4 | 118.8 | 0.2 | 0.6 | 1 |
| Example 8 | 72.4 | 27.6 | 111.8 | 0.3 | 1.1 | 2 |
| Example 9 | 72.2 | 27.8 | 111.7 | 0.3 | 1.1 | 2 |
| Comparative Example 1 | 72.3 | 27.7 | 108.6 | 0.3 | 2.6 | 5 |
| Comparative Example 2 | 72.3 | 27.7 | 109.4 | 0.6 | 2.1 | 5 |
| Comparative Example 3 | 72.1 | 27.9 | 112.9 | 1.2 | 0.5 | 1 |
| Comparative Example 4 | 72.6 | 27.4 | 110.2 | 0.3 | 1.8 | 4 |
| Comparative Example 5 | 72.6 | 27.4 | 110.3 | 0.3 | 1.7 | 4 |
| Comparative Example 6 | 72.5 | 27.5 | 109.6 | 0.2 | 1.9 | 4 |
| Comparative Example 7 | 72.3 | 27.7 | 108.3 | 0.4 | 2.1 | 4 |
| Comparative Example 8 | 72.3 | 27.7 | 109.1 | 0.4 | 2.0 | 4 |

EXPERIMENTAL EXAMPLE

In order to comparatively analyze properties of each resin prepared in Examples 1 to 9 and Comparative Examples 1 to 8, the following analyses were performed on each resin. The results thereof are presented in Table 1 below.

(1) Component Analysis

Amounts of a styrene-derived unit and an acrylonitrile-derived unit in each resin were analyzed by using an elemental analyzer (EA).

(2) Oligomer Content

An oligomer content in each resin was analyzed by gel chromatography.

(3) Glass Transition Temperature

A glass transition temperature (Tg) was measured from 10 mg of each resin using a differential scanning calorimeter (DSC), Q20 DSC by TA instruments, under conditions including a heating rate of 10° C./min and a nitrogen flow of 50 cc/min.

As illustrated in Table 1, it was confirmed that the styrene-acrylonitrile resins of Examples 1 to 9 prepared by the preparation method according to the embodiment of the present invention generally had high glass transition temperatures, excellent transparencies, and low mold deposits while having low oligomer contents in comparison to the styrene-acrylonitrile resins of Comparative Examples 1 to 7.

Specifically, with respect to the styrene-acrylonitrile copolymer of Comparative Example 1 which was prepared under the same condition as that of Example 1 except that the polymerization initiator according to the present invention was not used, similar levels of glass transition temperature and haze were obtained in comparison to the styrene-acrylonitrile copolymer of Example 1, but it was confirmed that the amount of oligomer was increased by two times and the mold deposit was significantly increased.

Also, with respect to the styrene-acrylonitrile copolymer of Comparative Example 3 which was prepared by using an excessive amount of the polymerization initiator beyond the amount of the polymerization initiator used according to the present invention, it was confirmed that the haze was increased by 6 times, while a difference in effects of reducing the oligomer content was insignificant, in comparison to the styrene-acrylonitrile copolymer of Example 3 which was prepared under the same condition except for the amount of the polymerization initiator used.

In addition, with respect to the styrene-acrylonitrile copolymer of Comparative Example 8 which was prepared by using the polymerization initiator having a 1 hour half-life temperature deviating from the 1 hour half-life temperature suggested in the present invention, the glass transition temperature was reduced, the oligomer content was increased by 1.5 times, and the mold deposit was significantly increased in comparison to the styrene-acrylonitrile copolymer of Example 2 which was prepared under the same condition except for the polymerization initiator.

The above results indicated that since the formation of the oligomer was suppressed by using the specific amount of the polymerization initiator according to the present invention, the amount of the oligomer in the prepared styrene-based resin may be reduced, and thus, surface properties, heat resistance, and processability of the styrene-based resin may be improved.

Furthermore, with respect to the styrene-acrylonitrile copolymer of Comparative Example 2 which was prepared under the same condition as that of Example 1 except that it was prepared at a temperature deviating from the temperature during the polymerization according to the present invention, it was confirmed that the amount of the oligomer was increased by about 1.6 times, the haze was reduced, and the mold deposit was significantly increased, in comparison to the styrene-acrylonitrile copolymer of Example 1.

Also, as a result of comparing each of the styrene-acrylonitrile copolymers prepared in Examples 1 and 2 with each of the styrene-acrylonitrile copolymers prepared in Comparative Examples 4, 5, and 6 which were prepared by adjusting the devolatilization conditions to conditions deviating from the temperature and pressure conditions suggested in the present invention, it was confirmed that, with respect to the styrene-acrylonitrile copolymer of Comparative Example 4, the oligomer content was increased by about 1.4 times and the mold deposit was significantly increased in comparison to the styrene-acrylonitrile copolymer of Example 1, and, with respect to the styrene-acrylonitrile copolymers of Comparative Examples 5 and 6, the oligomer contents were respectively increased by about 2.4 times and about 2.7 times and the mold deposits were significantly increased in comparison to the styrene-acrylonitrile copolymer of Example 2.

The above results indicated that the amount of the oligomer in the prepared styrene-based resin may be reduced by suppressing the formation of the oligomer and more easily removing the formed oligomer by adjusting the temperature during the polymerization and the devolatilization conditions to specific conditions as in the preparation method according to the present invention, and thus, the surface properties, heat resistance, and processability of the styrene-based resin may be improved.

The invention claimed is:

1. A method of preparing an aromatic vinyl-based resin, the method comprising steps of:
   (1) adding a polymerization initiator to a mixed solution including a reaction solvent, an aromatic vinyl-based monomer, and an ethylenically unsaturated nitrile-based monomer and performing polymerization to prepare a polymerization product; and
   (2) devolatilizing the polymerization product,
   wherein the polymerization initiator is an organic peroxide having a 1 hour half-life temperature of 105° C. to 145° C.,
   wherein the devolatilization of step (2) is performed through two-stage devolatilization in which primary devolatilization is performed in a temperature range of 150° C. to 160° C. and a pressure of 400 torr or less and secondary devolatilization is performed in a temperature range of 230° C. to 250° C. and a pressure of 20 torr or less.

2. The method of claim 1, wherein the mixed solution comprises:
   10 wt % to 30 wt % of the reaction solvent;
   35 wt % to 70 wt % of the aromatic vinyl-based monomer; and
   10 wt % to 35 wt % of the ethylenically unsaturated nitrile-based monomer.

3. The method of claim 1, wherein the 1 hour half-life temperature of the polymerization initiator is 5° C. to 25° C. lower than a temperature during the polymerization of step (1).

4. The method of claim 1, wherein the polymerization initiator comprises at least one selected from the group consisting of dicumyl peroxide, 2,2-bis(4,4-di-t-butylperoxy cyclohexane)propane, 1,1-bis(t-butylperoxy)cyclohexane, and 1,1-bis(t-hexylperoxy)cyclohexane.

5. The method of claim 1, wherein the polymerization initiator is added in an amount of 0.01 part by weight to less than 0.06 part by weight based on 100 parts by weight of total monomers.

6. The method of claim 1, wherein the polymerization of step (1) is performed in a temperature range of 130° C. to 150° C.

7. The method of claim 1, wherein the polymerization of step (1) is performed by further adding a chain transfer agent.

8. The method of claim 7, wherein the chain transfer agent comprises at least one selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan.

9. The method of claim 1, wherein the reaction solvent comprises at least one selected from the group consisting of ethylbenzene, toluene, xylene, methylethylketone, and methylisobutylketone.

10. The method of claim 1, wherein the aromatic vinyl-based monomer comprises at least one selected from the group consisting of styrene, α-methylstyrene, p-bromostyrene, p-methylstyrene, p-chlorostyrene, and o-bromostyrene.

11. The method of claim 1, wherein the ethylenically unsaturated nitrile-based monomer comprises at least one selected from the group consisting of acrylonitrile, methacrylonitrile, ethacrylonitrile, phenylacrylonitrile, and α-chloroacrylonitrile.

* * * * *